United States Patent
Liu et al.

(10) Patent No.: US 9,609,184 B2
(45) Date of Patent: *Mar. 28, 2017

(54) DEPTH CAMERA

(71) Applicants: Ling-Wei Liu, Taipei (TW);
Hung-Chang Tsai, Taipei (TW)

(72) Inventors: Ling-Wei Liu, Taipei (TW);
Hung-Chang Tsai, Taipei (TW)

(73) Assignee: LIPS CORPORATION, Taipei (TW)

( * ) Notice: Subject to any disclaimer, the term of this patent is extended or adjusted under 35 U.S.C. 154(b) by 91 days.

This patent is subject to a terminal disclaimer.

(21) Appl. No.: 14/564,021

(22) Filed: Dec. 8, 2014

(65) Prior Publication Data
US 2016/0050347 A1    Feb. 18, 2016

Related U.S. Application Data

(63) Continuation-in-part of application No. 14/458,298, filed on Aug. 13, 2014, now Pat. No. 9,420,149.

(51) Int. Cl.
*H04N 5/225* (2006.01)
*H04N 13/02* (2006.01)
*G06F 3/01* (2006.01)
*G06K 9/00* (2006.01)

(52) U.S. Cl.
CPC .......... *H04N 5/2252* (2013.01); *G06F 3/017* (2013.01); *G06K 9/00335* (2013.01); *H04N 5/2256* (2013.01); *H04N 13/0253* (2013.01); *H04N 13/0271* (2013.01)

(58) Field of Classification Search
CPC .......... H04N 13/0253; H04N 13/0271; H04N 2013/0081; H04N 5/2252; H04N 5/2254; H04N 2213/003; G01S 17/08; G06F 3/005
USPC .......................................... 348/48, 373, 374
See application file for complete search history.

(56) References Cited

U.S. PATENT DOCUMENTS

| 2003/0062413 | A1* | 4/2003 | Gardiner | G06K 7/10732 235/454 |
|---|---|---|---|---|
| 2009/0020687 | A1* | 1/2009 | Lehmann | G01S 7/4816 250/208.1 |
| 2009/0122394 | A1* | 5/2009 | Son | H04N 5/2257 359/353 |
| 2010/0039500 | A1* | 2/2010 | Bell | H04N 13/0253 348/46 |
| 2010/0060722 | A1* | 3/2010 | Bell | G06F 3/017 348/51 |
| 2013/0201288 | A1* | 8/2013 | Billerbeck | H04N 13/0203 348/46 |
| 2013/0335560 | A1* | 12/2013 | Higashiura | G01S 17/08 348/140 |

(Continued)

Primary Examiner — John Villecco

(57) ABSTRACT

The depth camera includes a control module and a lighting module. The control module includes a control board, a control unit, a seat and a lens mounted on the seat. The lighting module is mechanically and electrically connected to the control module and includes a base board having a through hole for being passed by the lens and corresponding to the control board in position. A plurality of lighting units are symmetrically arranged on the base board and beside the through hole. A shade module is fastened on the base board and has a mount board and shades thereon. The bottom of each shade has an opening for receiving one of the lighting units.

10 Claims, 6 Drawing Sheets

(56) References Cited

U.S. PATENT DOCUMENTS

| | | | |
|---|---|---|---|
| 2014/0110485 A1* | 4/2014 | Toa | G06K 7/10821 235/462.21 |
| 2014/0160459 A1* | 6/2014 | Huber | G01S 17/08 356/5.01 |
| 2015/0054001 A1* | 2/2015 | Oganesian | H04N 5/2256 257/82 |
| 2015/0229912 A1* | 8/2015 | Masalkar | G01S 7/481 348/46 |
| 2016/0025855 A1* | 1/2016 | Camarri | G01S 7/4816 250/206.1 |

* cited by examiner

DEPTH CAMERA

CROSS-REFERENCE TO RELATED APPLICATIONS

This application is a continuation-in-part of U.S. patent application Ser. No. 14/458,298 filed Aug. 13, 2014.

BACKGROUND OF THE INVENTION

1. Technical Field

The invention relates to depth cameras, particularly to a depth camera with a symmetric light source.

2. Related Art

A depth camera can be used to control a computer through a gesture. Moreover, a depth camera can be further used to control a TV game through a body motion. This makes human-machine interaction more intuitive.

Such human-machine interaction needs a depth camera which can store a three-dimensional image into a two-dimensional format. A depth camera can measure a Z-axis distance between every shot point and the camera so that it can record three-dimensional image data.

A common method for measuring the Z-axis distance is to use the principle of time of flight (TOF). Simply speaking, a time period from a light beam emitted by a light source to be reflected by a shot point to come back to the origin can be used to calculate the Z-axis distance.

A key to the TOF principle is creature of the light source. A light source of a typically conventional depth camera is lighting units arranged on only one side of the lens. However, in practice, such an arrangement will cause an apparent and sharp shadow. The shadow will reduce the image quality. Additionally, the light source is provided with shades to isolate the influence of other light sources. A conventional method for assembling the shades is to manually process the shades one by one. Such a method must generate an error which will deflect the light beam from the light source. This will cause a distortion to the position of the shot object. This is a primary drawback of the TOF method.

SUMMARY OF THE INVENTION

A primary object of the invention is to provide a depth camera, which symmetrically arranges light sources beside the lens. This can provide equable light to the object avoid a shadow.

Another object of the invention is to provide a depth camera, which modularizes the shades on the light sources. This can improve accuracy of assembling of the shades and light sources.

Still another object of the invention is to provide a depth camera, which adds a fan for improve the effect of heat dissipation.

To accomplish the above objects, the depth camera of the invention includes a control module and a lighting module. The control module includes a control board, a control unit, a seat and a lens mounted on the seat. The lighting module is mechanically and electrically connected to the control module and includes a base board having a through hole for being passed by the lens and corresponding to the control board in position. A plurality of lighting units are symmetrically arranged on the base board and beside the through hole. A shade module is fastened on the base board and has a mount board and shades thereon. The bottom of each shade has an opening for receiving one of the lighting units.

DETAILED DESCRIPTION OF INVENTION

Figure 1:
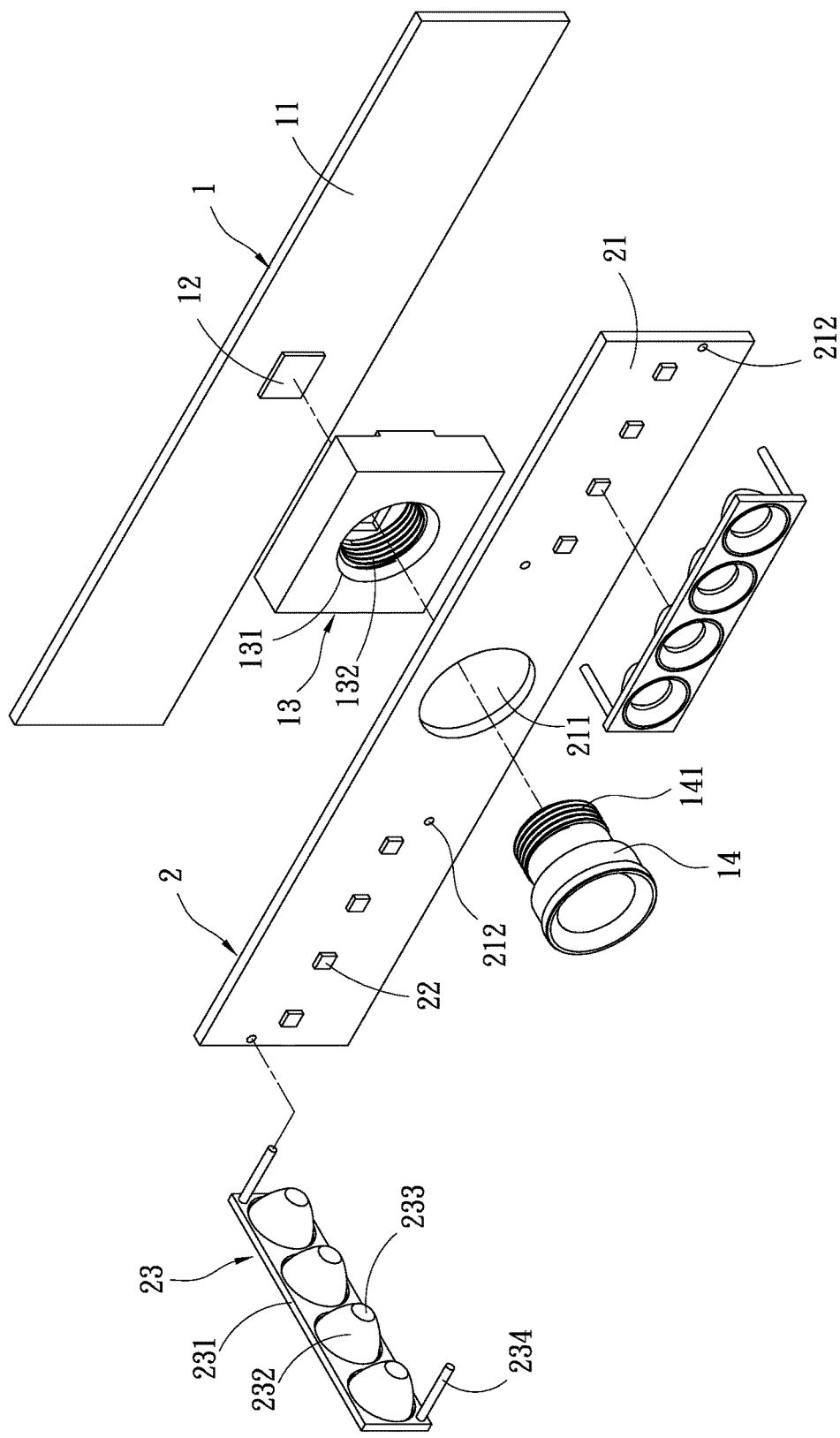
FIG. 1 is an exploded view of the first embodiment of the invention.
Figure 3:
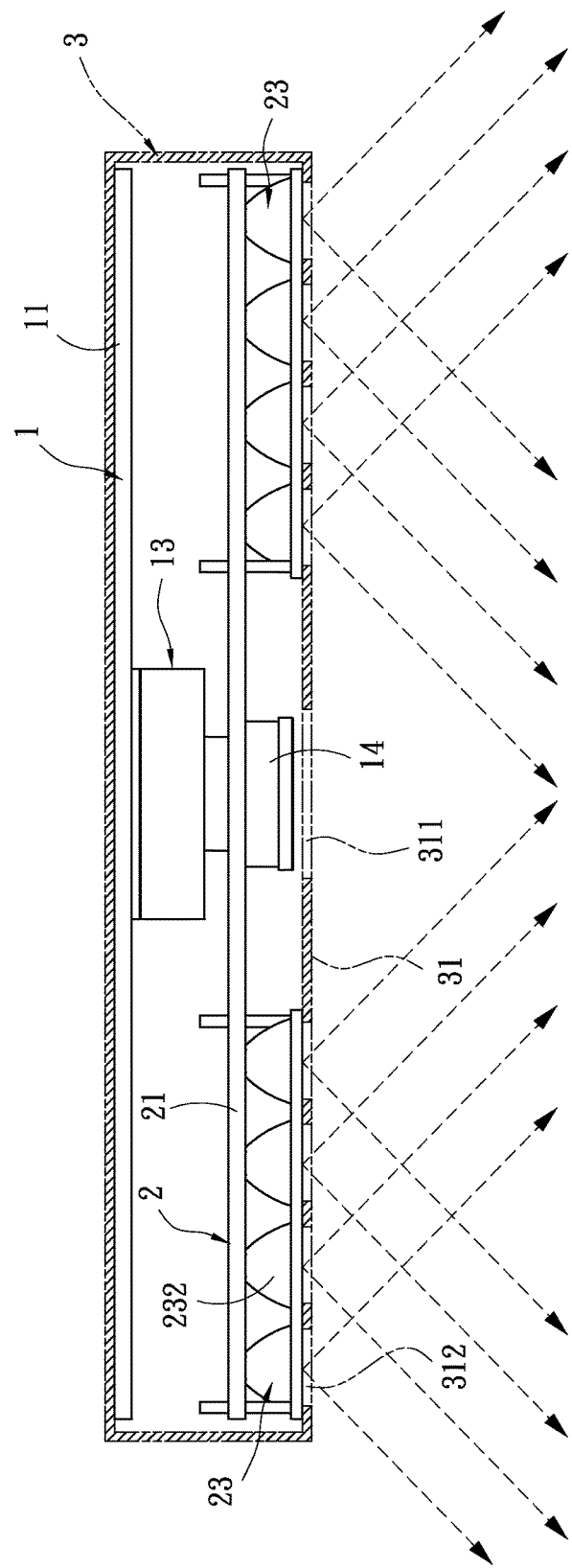
FIG. 3 is a cross-sectional schematic view of the first embodiment of the invention.

Please refer to FIG. 1. The invention includes a control module 1 and a lighting module 2. Both the control module 1 and the lighting module 2 are installed in a housing 3. As shown in FIG. 3, the control module 1 includes a control board 11, which is a printed circuit board. A control unit 12, which is a control chip, is disposed on the control board 11 for controlling the operation of the depth camera. A seat 13 is disposed on the control board 11. The seat 13 is formed with a connecting hole 131. The connecting hole 131 is formed with a thread 132. A lens 14 is mounted on the seat 13 and electrically connected to the control unit 12. The lens 14 has a connecting end 141 with a thread for screwing with the thread 132 of the connecting hole 131.

Please refer to FIG. 1 again. The lighting module 2 includes a base board 21, which electrically connects to the control module 11. The seat 13 is sandwiched between the control board 11 and the base board 21. The base board 21 has a through hole 211. In this embodiment, the through hole 211 is located at the center of the base board 21 for being passed by the lens 14 as shown in FIG. 3. A plurality of lighting units 22 are arranged on the base board 21 and beside the through hole. The lighting units 22 are symmetrically located on two sides of the through hole 211 in a row. The lighting units 22 may be infrared or laser LEDs. At least one shade module 23 is fastened on the base board 21. In the shown embodiment, two shade modules 23 are disposed. The shade module 23 has a mount board 231 and shades 232 formed thereon. The bottom of each shade 232 has an opening 233 for receiving one of the lighting units 22. The mount board 231 is provided with fixing rods 234. The fixing rods 234 are inserted into fixing holes 212 of the base board 21 to make an accurately relative position against the base board 21. The lighting units 22 and the shades 232 are arranged correspondingly in a one-to-one manner.

Figure 2:
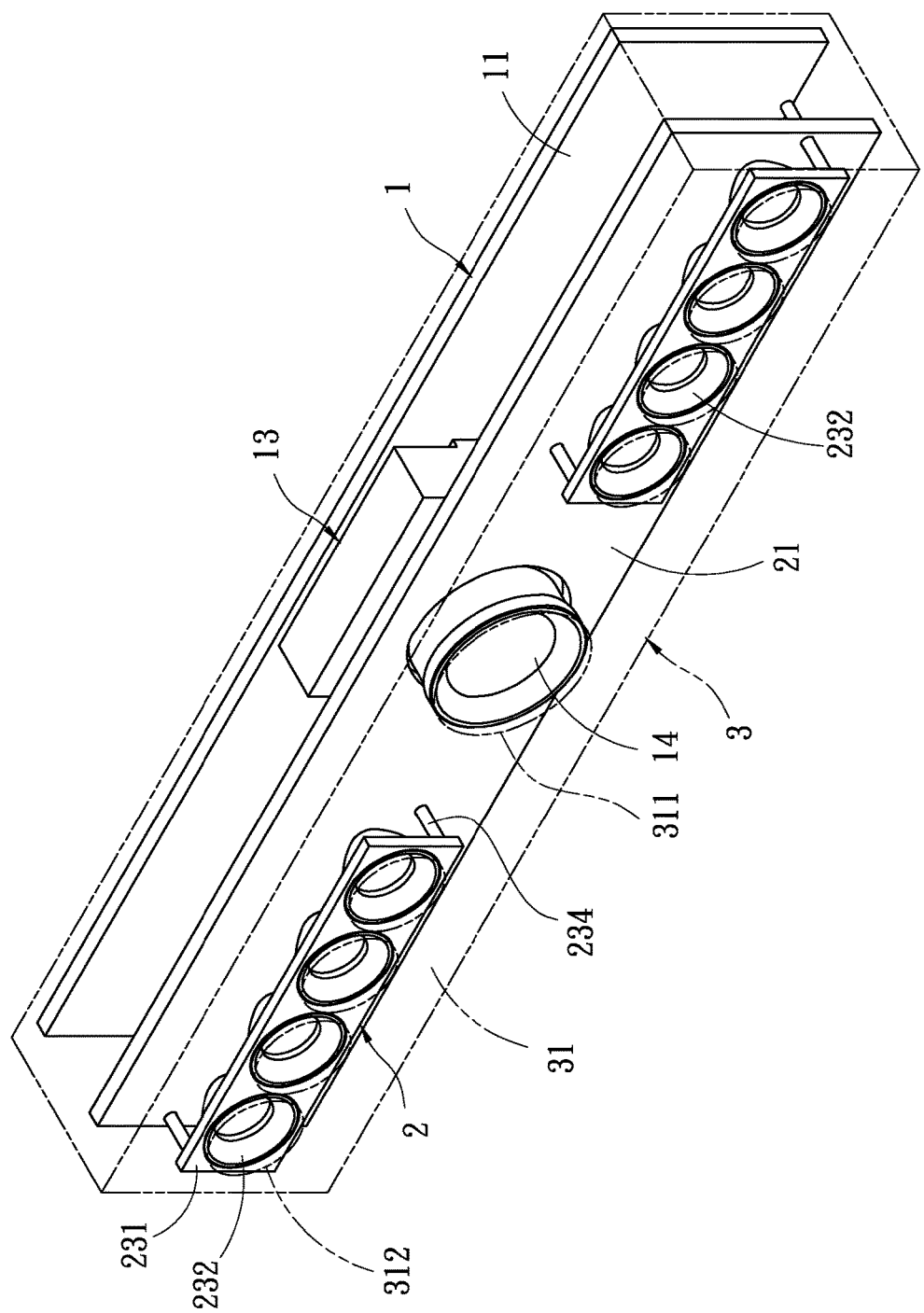
FIG. 2 is an assembled view of the first embodiment of the invention.

The control module 1 and the lighting module 2 are accommodated in the housing 3. A first face 31 of the housing 3 is formed with an opening 311 corresponding to the lens 14 in position for exposing the lens 14. The first face 31 is further formed with apertures 312 separately corresponding to the lighting units 22 in position for exposing the lighting units 22 as shown in FIG. 2. As shown in FIG. 3, lights from the lighting units 22 symmetrically located on two sides of the lens 14 will overlap with each other. Shadows will not be generated and an equable brightness to the object will be obtained.

Figure 4:
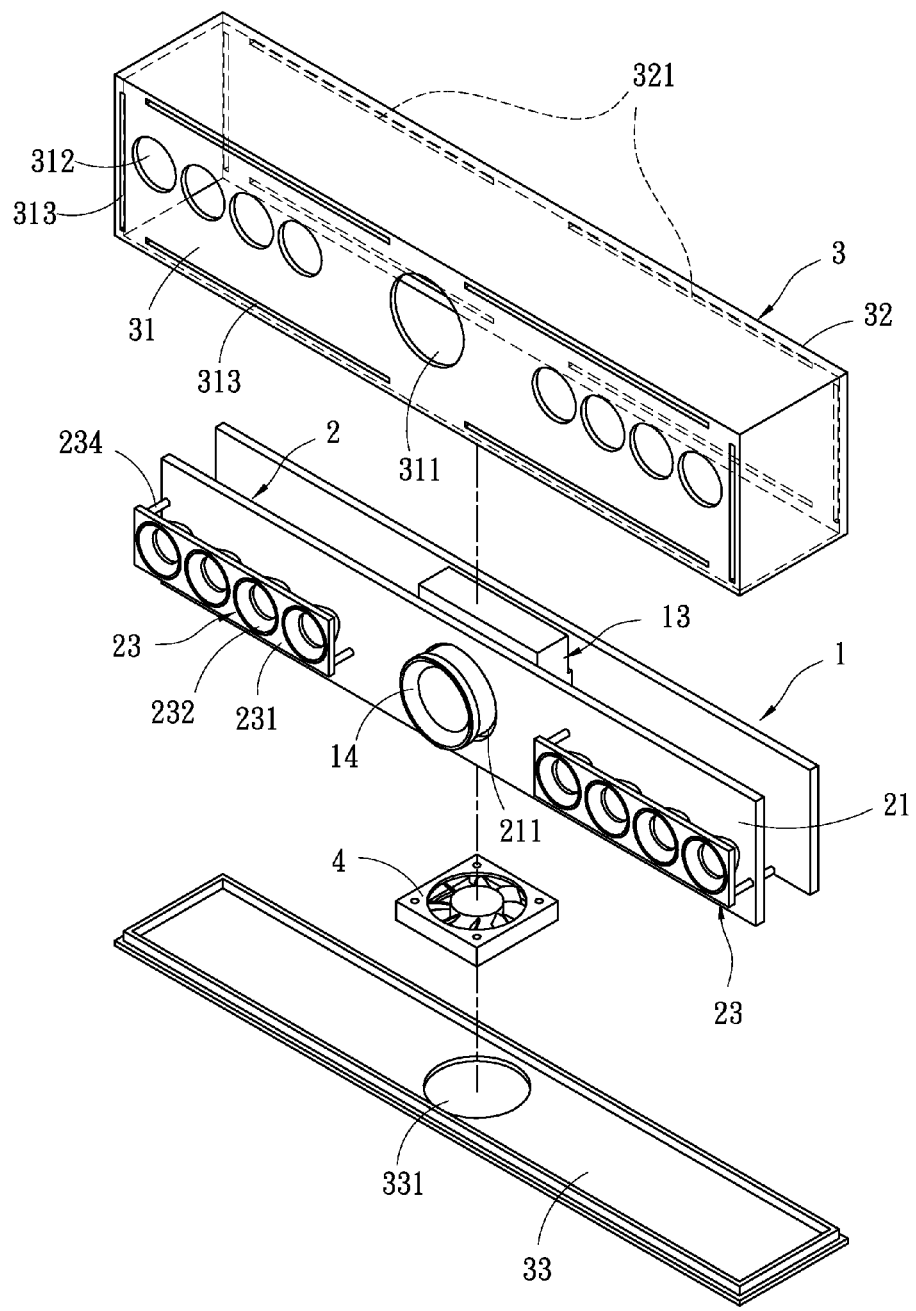
FIG. 4 is an exploded view of the second embodiment of the invention.
Figure 5:
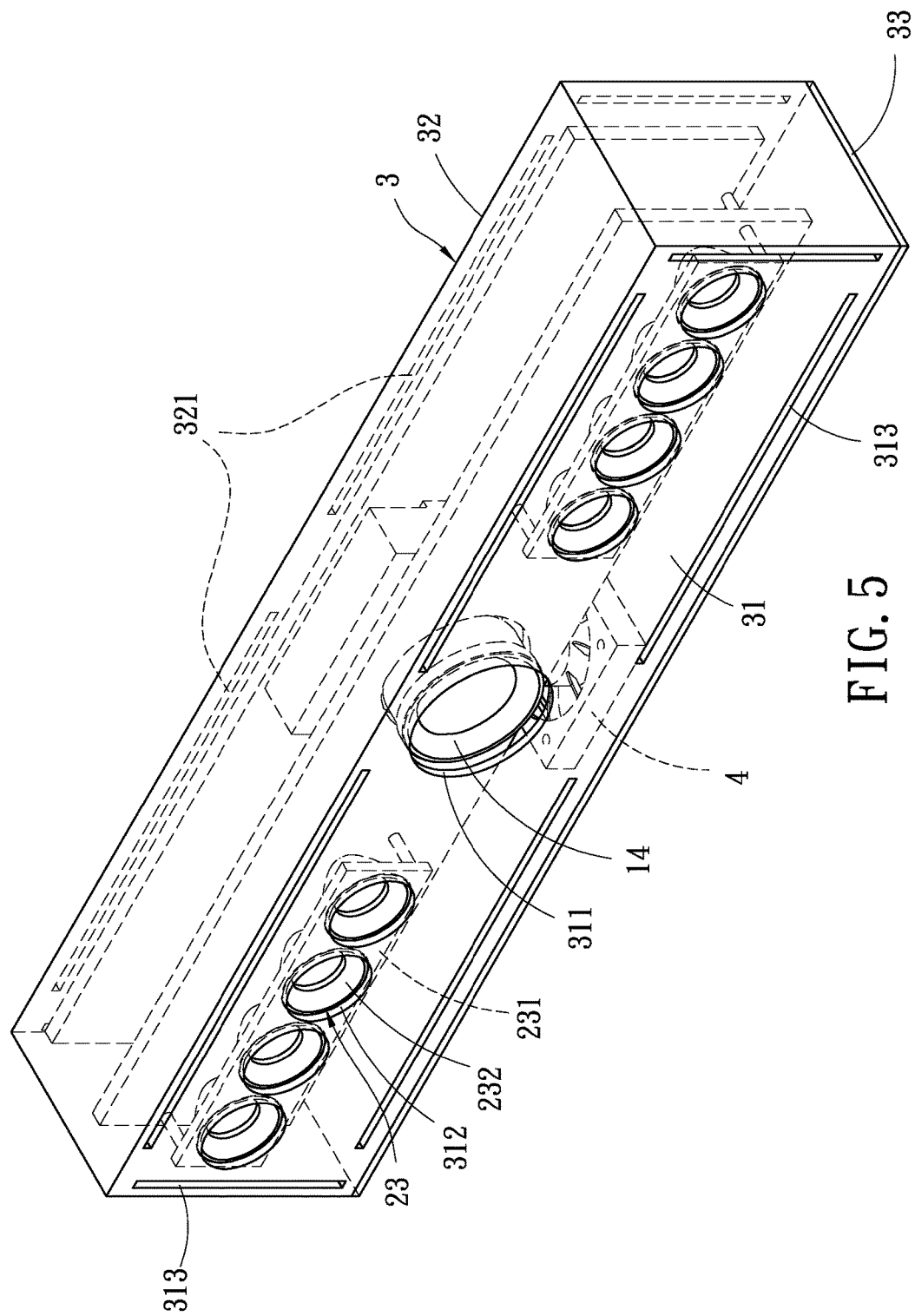
FIG. 5 is an assembled view of the second embodiment of the invention.

Please refer to FIG. 4, which shows a second embodiment of the invention. A fan 4 is disposed under the control module 1 and the lighting module 2. In the shown embodiment, the fan 4 is under the lens 14 and electrically connected to the control module 1. Edges of the first face 31 of the housing 3 are formed with slots 313. Edges of a second face 32 which is opposite to the first face 31 are formed with slots 321, too. The bottom of the housing 3 is provided with a removable chassis 33 with a vent 331 corresponding to the fan 4 as shown in FIG. 5.

Figure 6:
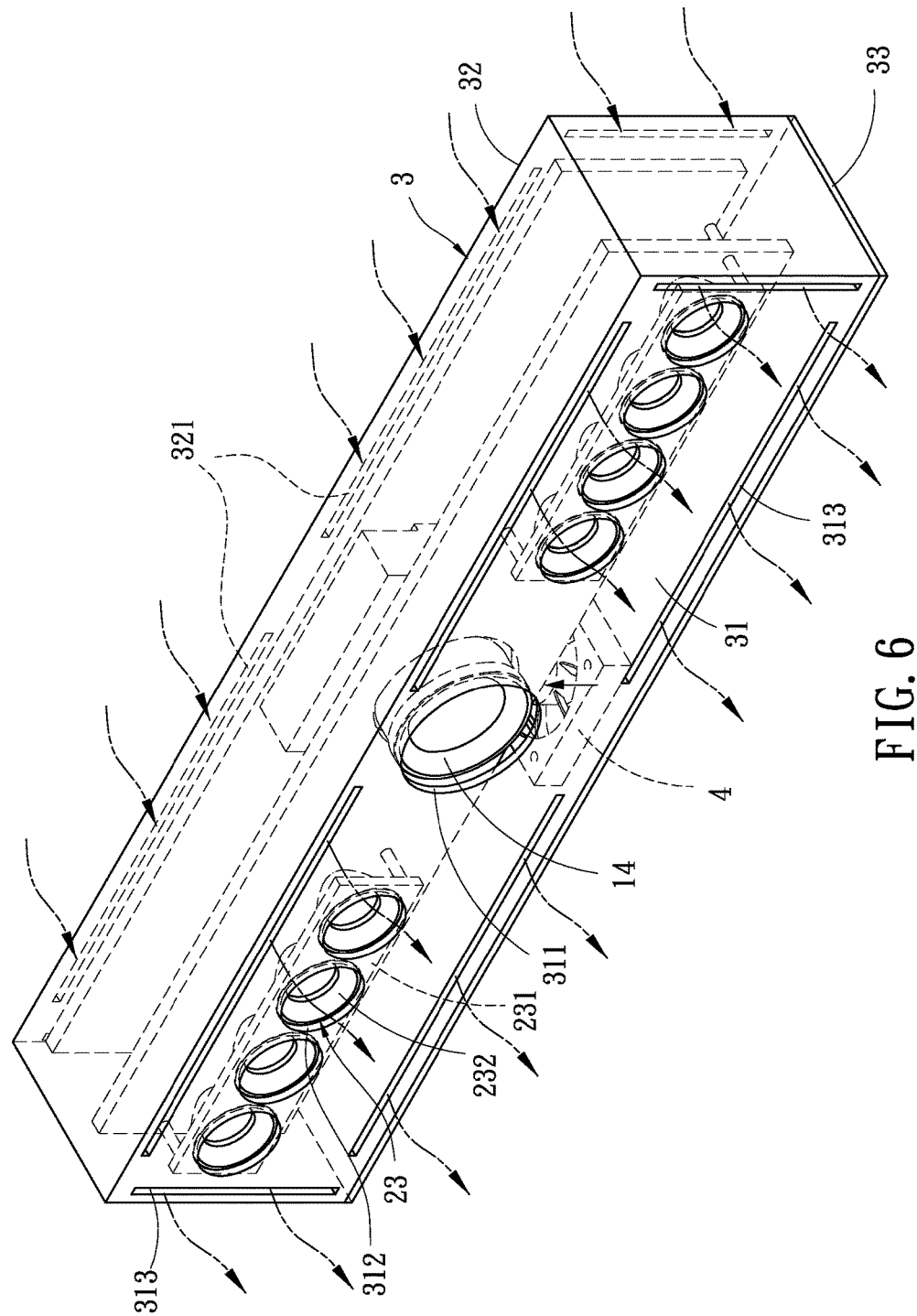
FIG. 6 is a schematic view showing airflow driven by the fan of the second embodiment of the invention.

Please refer to FIG. 6. The outside air is absorbed into the housing 3 by the fan 4. The absorbed air takes the inside heat and flows out through the slots 313, 321. The recurring air can help heat dissipation of the depth camera.

It will be appreciated by persons skilled in the art that the above embodiment has been described by way of example only and not in any limitative sense, and that various alterations and modifications are possible without departure from the scope of the invention as defined by the appended claims.

What is claimed is:

1. A depth camera comprising:
    a control module comprising:
        a control board;
        a control unit, disposed on the control board;
        a seat, disposed on and electrically connected to the control board; and
        a lens, mounted on the seat, and electrically connected to the control unit; and
    a lighting module, mechanically and electrically connected to the control module, comprising:
        a base board, having a through hole for being passed by the lens, corresponding to the control board in position, wherein the seat is sandwiched between the control board and the base board;
        a plurality of lighting units, symmetrically arranged on the base board and beside the through hole; and
        a shade module, fastened on the base board, having a mount board and shades thereon, a bottom of each shade having an opening for receiving one of the lighting units.

2. The depth camera of claim 1, wherein the mount board is provided with fixing rods, and the fixing rods are separately inserted into fixing holes of the base board.

3. The depth camera of claim 1, wherein the lighting units are infrared or laser LEDs.

4. The depth camera of claim 1, wherein the lens has a connecting end with a thread.

5. The depth camera of claim 4, wherein the seat is formed with a connecting hole with a thread for screwing with the thread of the connecting end.

6. The depth camera of claim 1, further comprising a housing for accommodating both the control module and the lighting module, wherein a first face of the housing is formed with an opening corresponding to the lens in position, and the first face is further formed with apertures separately corresponding to the lighting units in position.

7. The depth camera of claim 6, wherein a fan is disposed under the lens toward the control module and the lighting module.

8. The depth camera of claim 7, wherein a bottom of the housing is provided with a removable chassis with a vent corresponding to the fan.

9. The depth camera of claim 6, wherein edges of the first face of the housing are formed with slots.

10. The depth camera of claim 6, wherein edges of a second face which is opposite to the first face are formed with slots.

* * * * *